United States Patent [19]
Kozloff

[11] Patent Number: 6,009,681
[45] Date of Patent: Jan. 4, 2000

[54] TRUSS BRACKET

[76] Inventor: Larry Alexander Kozloff, 33828 Cindy St., Livonia, Mich. 48150

[21] Appl. No.: 09/071,844

[22] Filed: May 1, 1998

[51] Int. Cl.[7] .................................................... E04B 9/12
[52] U.S. Cl. ............................... 52/712; 52/714; 52/715; 411/466; 403/237; 403/386
[58] Field of Search .......................... 52/712, 714, 715; 411/466, 461, 462, 463; 403/230, 237, 386, 400

[56] References Cited

U.S. PATENT DOCUMENTS

| | | | |
|---|---|---|---|
| Re. 12,853 | 6/1903 | Guilhous . | |
| 836,310 | 11/1906 | Ferguson . | |
| 1,626,589 | 5/1927 | Alber | 52/715 |
| 1,974,819 | 9/1934 | Koerner | 52/712 |
| 2,163,381 | 6/1939 | Marsan | 52/712 |
| 3,722,928 | 3/1973 | Skubic | 52/714 |
| 3,828,514 | 8/1974 | Jureit | 403/230 |
| 3,836,106 | 9/1974 | Gray | 248/229 |
| 4,027,454 | 6/1977 | Schuplin | 52/714 |
| 4,297,048 | 10/1981 | Jureit et al. | 411/466 X |
| 4,455,805 | 6/1984 | Rionda et al. . | |
| 4,464,821 | 8/1984 | Haytayan | 29/432 |
| 4,561,230 | 12/1985 | Rionda et al. . | |
| 4,726,165 | 2/1988 | Brinsa . | |
| 4,766,707 | 8/1988 | Knudson | 52/715 X |
| 4,862,667 | 9/1989 | Melland | 52/732 |
| 5,619,836 | 4/1997 | Rouch et al. | 52/715 |
| 5,653,079 | 8/1997 | Loeffler et al. | 52/712 |
| 5,758,465 | 6/1998 | Logue | 52/712 X |

FOREIGN PATENT DOCUMENTS

| | | |
|---|---|---|
| 27 51 188 A1 | 5/1978 | Germany . |
| 460035 | 1/1937 | United Kingdom . |
| 1295047 | 11/1972 | United Kingdom ................ 411/466 |

*Primary Examiner*—Carl D. Friedman
*Assistant Examiner*—Phi Dieu Tran A
*Attorney, Agent, or Firm*—Chupa & Alberti, P.C.

[57] ABSTRACT

A truss bracket 28 for securing a spanning member of a truss fixedly to a wall plate member of an interior wall of a building such as a residential house. The truss bracket 28 includes a base portion, an inside upright portion extending perpendicularly of the base portion, a top portion extending a perpendicularly from an upper end portion of the inside upright portion, and an outer lip portion extending perpendicularly of an outer edge portion of the top portion and also parallel to the inside upright portion. The outer lip portion includes at least one "L"-shaped spike portion which is adapted to be engaged to penetrate the spanning member, thereby preventing the spanning member from moving either horizontally or vertically relative to the plate member. The inside upright potion, top portion and outer lip portion are adapted to fit securely over a portion of a two-by-four stud representing a spanning member of a truss, and to secure the two-by-four stud plate member of the interior wall, to thereby help significantly prevent or completely eliminate bowing or flexing of the two-by-four stud in response to significant temperature and humidity changes such as those occurring between summer and winter months. The bracket is preferably integrally formed and is installed quickly and easily by skilled personnel such as carpenters. Conventional lag bolts or nails may be used to secure the base portion of the truss bracket to the plate member. The truss bracket may be constructed of aluminum or metal, and preferably is comprised of 16 gauge galvanized steel.

10 Claims, 3 Drawing Sheets

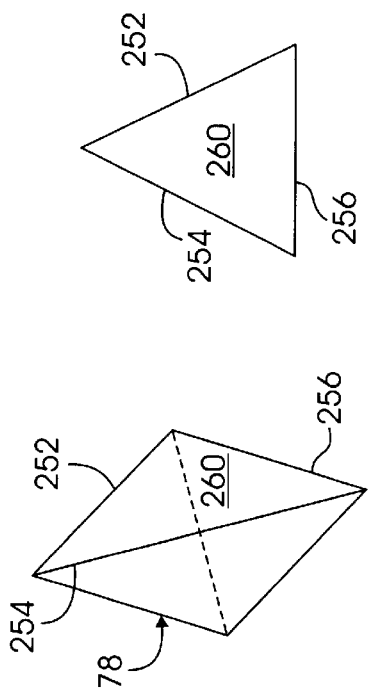
Fig. 10
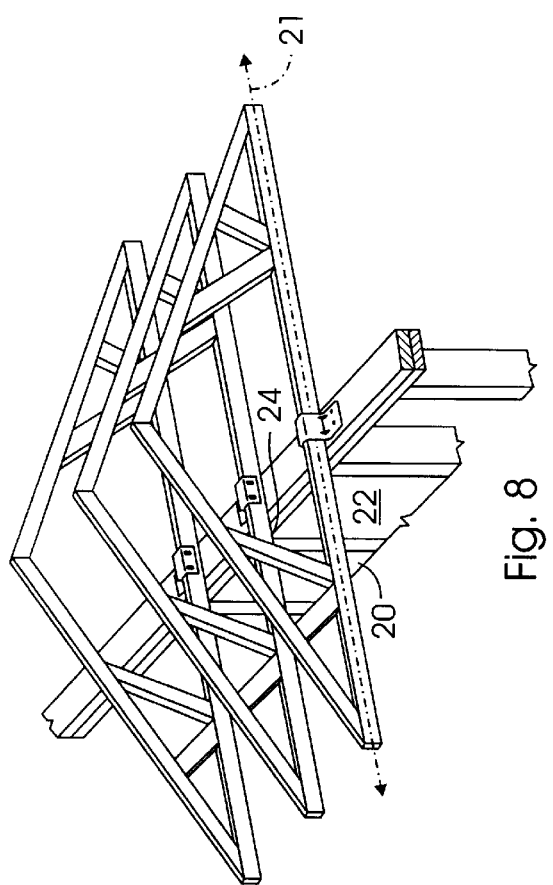
Fig. 8
Fig. 9
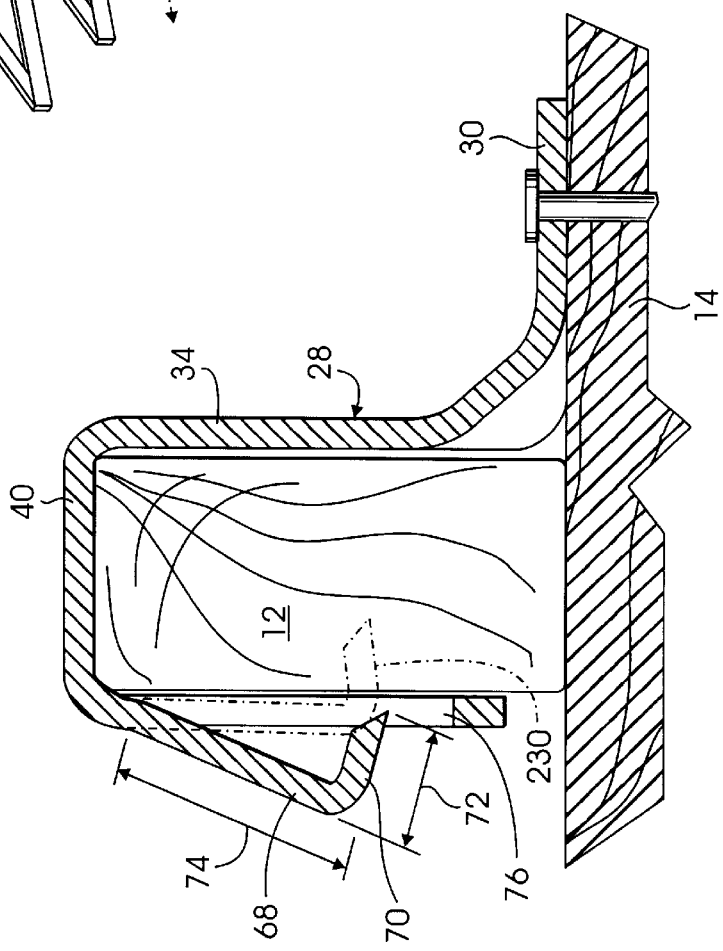
Fig. 7

TRUSS BRACKET

BACKGROUND OF THE INVENTION

1. Field of the Invention

This invention relates to brackets, and more particularly to a truss bracket for fixedly securing a spanning member of a truss to a plate or top member of an interior wall of a dwelling or building, to thereby substantially prevent and/or substantially reduce the amount of flexing or bowing of the spanning member in response to conditions of heat and cold.

2. Background

Trusses are used in a wide variety of construction applications to form roofs for structures such as residential homes and commercial buildings. Typically, a truss includes a generally rectangular wooden member, often and commonly referred to within the lumber industry as a "two-by-four stud" or a "two-by-six stud", which forms a "spanning member" and which usually extends parallel to the floor of the dwelling, and perpendicular to the interior walls of the dwelling. Secured at opposed ends of the spanning member are substantially similar "stud" members which are each mutually joined at respective ends distally positioned from the spanning member and which cooperate with the spanning member to form a substantially triangularly shaped wooden support structure referred to as a truss. As should be appreciated by those of ordinary skill in the art, a plurality of these trusses are disposed within a structure, upon several plate members, in this manner, and cooperatively form a roof.

Typically, the spanning member of a truss rests on several plates or top wall members (e.g., each plate or top member being a "two-by-four" wooden beam or "stud" which is usually positioned in a plane parallel to the plane formed by the floor by the use of several wooden column type beams). Particularly, each spanning member is typically secured to the top of each of the plate member by nails or like implements driven into the opposed sides of the spanning member. Typically, these nails or securing implements are driven into the spanning member at some angle in order that the nails or other implements penetrate through the spanning member and the top plate upon which it rests. In some arrangements, it is very difficult to drive these nails or like implements into the spanning member at the proper locations and/or at the proper angles required to properly secure the spanning member to the plate member due to a lack of space and/or vertical clearance caused by the presence of cross members and other structural obstacles that comprise the interior structure of the roof or dwelling. Without such sufficient space or vertical clearance, it is sometimes impossible, or at a minimum, very difficult and time consuming, for an individual to hold and position the nails or implements and to properly use the tools (e.g. a hammer) to drive these nails or like implements into the various spanning and plate members at the proper angles and locations. As a result, certain locations of the spanning member are not sufficiently and/or properly secured to the various plate members, resulting in a relatively weak structure.

Moreover, as the wood "dries out" over time, and as the temperature and humidity of the surrounding environment fluctuates due to changing weather conditions, the spanning member of each of the various trusses used to construct a roof, will "flex" or "bow" in response to these changing environmental conditions. As these conditions fluctuate and as the spanning member begins to flex or bow, the nails or like implements which are typically relied upon to secure the truss to the various plate members of the interior walls often bend or "give," allowing this bowing or flexing action to occur and continue. The bowing or flexing of each of the spanning members can become significant, and often results in a bulging of about ½" to about ¾" at various points, with respect to the original longitudinal axis of symmetry of the spanning members. The bowing and flexing of these spanning members under changing environmental conditions can occur and be significant even when the spanning members are carefully secured to each of the supporting plate members at a plurality of locations by nails or other like implements.

When such bowing or flexing of one or more of these spanning members occurs, wall board or dry wall board secured to the underside of the spanning member deforms. For example and without limitation, a portion of a ceiling of an interior room, is typically lifted upwardly. When this occurs, the tape at the joints of upper side walls is pulled outwardly of the joint as the ceiling wall board or dry wall is lifted upwardly, thus causing significant damage to the finish of the corners of the interior rooms of the dwelling and further causing an unsightly and unfinished appearance. Often, the cost of repairing ceiling and wall joints where the dry wall or wall board has been "lifted up" by this "bowing" or "flexing" of the truss can amount to several hundred dollars or more to retape and patch properly.

There is therefore a need to provide a truss bracket for fixedly securing a spanning member to a plate member, which overcomes some or all of the difficulties and drawbacks associated with the previously delineated prior methods; which is relatively inexpensive to manufacture; which is relatively strong and relatively durable; which is resistant to bending and flexing; which can be installed relatively quickly and relatively easily; and which can be installed in locations having limited space and/or vertical clearance.

SUMMARY OF THE INVENTION

It is therefore a primary object of this invention to provide a truss bracket which is adapted to be secured to a plate member of an interior wall and to be selectively and fixedly secured over at least a portion of a spanning member of a truss to thereby hold the spanning member fixedly against the plate member, thus substantially preventing bowing or flexing of the spanning member of the truss.

It is another object of this invention to provide a truss bracket which is relatively compact, light in weight, and adapted to selectively fit over "two-by-four studs" or "two-by-six studs".

It is another object of this invention to provide a truss bracket which may be manufactured relatively inexpensively from widely commercially available materials, and which is further highly resistant to flexing and corrosion.

It is yet another object of this invention to provide a truss bracket which can be easily and quickly secured by skilled workmen, such as carpenters, during the assembly of dwellings such as residential houses and/or commercial buildings, even in areas having a limited amount of space and/or vertical clearance.

The previously delineated objects are achieved by a truss bracket made in accordance with the teachings of the preferred embodiments of the present invention. According to one aspect of the present invention, the truss bracket generally comprises a base portion, an inside upright portion extending perpendicularly of the base portion, a top portion extending perpendicularly of the inside upright portion, and an outer lip portion extending perpendicularly of the top portion. The base portion is adapted to be secured, such as by lag bolts, to a plate member or an interior wall of the dwelling. The inside upright portion, top portion and outer lip portion of the bracket are adapted to and cooperate to form a spanning member reception channel which is adapted to receive a portion of a spanning member of a truss, which typically represents a "two-by-four stud" or a "two-by-six stud". Accordingly, the inside upright portion of the truss bracket may have a length of about 3.5" to about 5.5" depending upon whether a "two-by-four stud" or a "two-by-six stud" is used to construct the truss. The top portion further has a length of about 1⅝" to accommodate either a "two-by-four stud" or a "two-by-six stud". The outer lip portion further includes one or more "L"-shaped spike portions which are selectively movable from a first unsecured position to a second secured position in which the "L" shaped spikes partially penetrate the spanning member. When the truss bracket is secured to the plate member of an interior wall, and over a portion of the spanning member of the truss, the truss bracket operates to fixedly secure the spanning member to the plate member, to thereby prevent or reduce the amount of bowing or flexing of the spanning member.

In an alternative preferred embodiment of the invention, the truss bracket also includes one or more dimpled portions positioned at the junction where the base portion and the inside upright portion meet and which are adapted to substantially prevent and/or substantially reduce the amount of bending of the bracket, thereby further helping to prevent any twisting of the spanning member relative to the plate member such as when high winds are present. Applicant has found that such dimples further enhance the overall structural integrity of the bracket and the dwelling or building on which it is used.

In the preferred embodiments the various portions of the truss bracket are integrally formed from aluminum or metal of a suitable gauge, and adapted to resist corrosion. As should be appreciated by those of ordinary skill in the art, the preferred embodiments of the truss bracket may be constructed inexpensively and further secured to the plate member of an interior wall, and over the spanning member of a truss, quickly and easily by skilled workman such as carpenters.

Further objects, features, and advantages of the present invention will become apparent from any consideration of the following description and the appended claims, when taken in conjunction with the accompanying drawings.

BRIEF DESCRIPTION OF THE DRAWINGS

The various advantages of the present invention will become apparent to one skilled in the art by reading the following specification and subjoined claims and by referencing the following drawings in which:

FIG. 7 is a side view of the truss bracket made in accordance with a preferred embodiment of the present invention taken along view line 4—4 shown in FIG. 5 and further illustrating the receipt, by the truss bracket, of a spanning member;

FIG. 8 is a perspective view of a plurality of truss brackets made in accordance with the preferred embodiment of the present invention and illustrating the manner in which the inside upright portion of the brackets fits securely over the spanning members of the truss to cooperatively hold and/or secure the spanning members abuttingly against a plate member in a manner which is effective to achieve the various objects of the invention which have been previously delineated;

FIG. 9 is a fragmentary perspective view of one of the dimple sections shown in FIG. 5; and FIG. 10 is a view of the dimple section taken in the direction of arrow 10.

DETAILED DESCRIPTION OF THE PREFERRED EMBODIMENT

Figure 1:
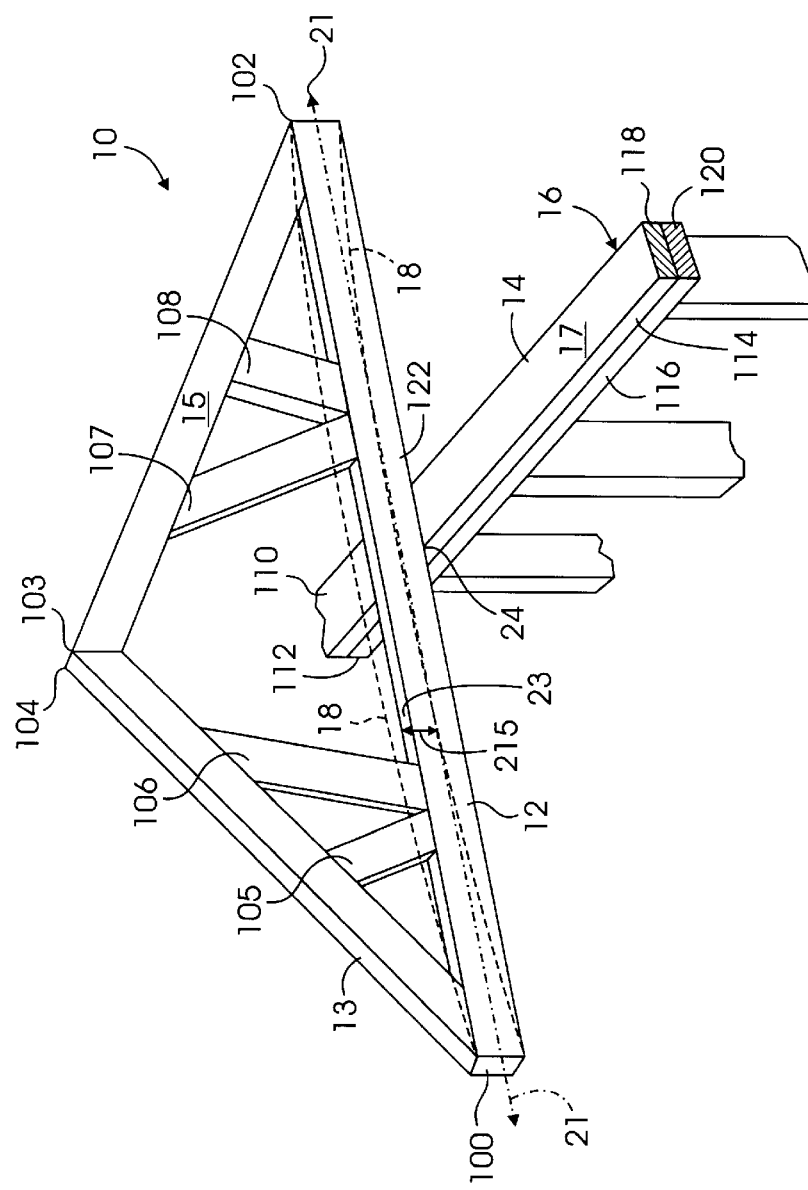
FIG. 1 is a perspective view of a single highly simplified truss including a spanning member represented by a "two-by-four stud" resting on and/or being supported by a plate member of an interior wall of a dwelling, and showing, in phantom, an exaggerated bowing or flexing of the spanning member which occurs in response to significant environmental changes, such as temperature and humidity fluctuations.
Figure 6:
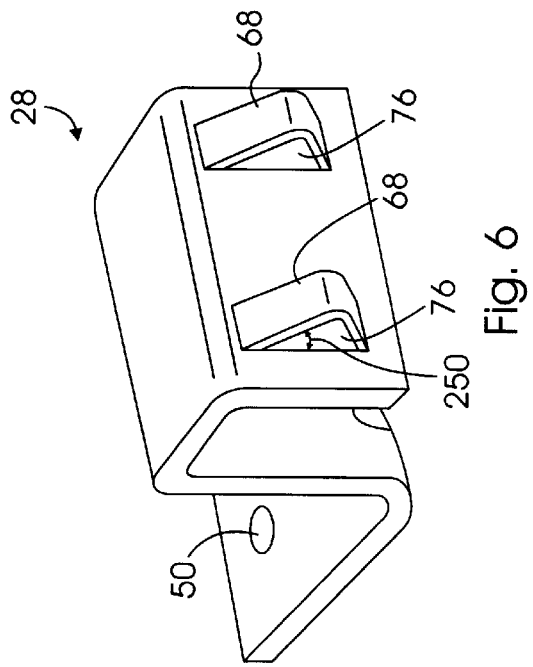
FIG. 6 is a rear perspective view of the truss bracket shown in FIGS. 4 and 5.

Referring to FIG. 1, there is shown a simplified perspective drawing of a typical wooden type or composite type truss 10 which includes a generally elongated wooden spanning member 12, having a rectangular cross section, and two other wooden members 13, 15 which are joined to member 12 at first respective ends 100, 102 and which are further mutually joined at second respective ends 103, 104, thereby cooperating with the spanning member 12 to form a substantially triangularly shaped truss 10. As should be appreciated by those of ordinary skill in the art, other wooden members (e.g. "two by four studs") 105, 106, 107, and 108 may be employed and connected to members 13 and 12 or members 15 and 12 in order to provide further structural support for the triangularly shaped truss 10. The spanning member 12 typically is comprised of a commercially available wooden member referred to in the lumber industry as a "two-by-four stud", or alternatively a "two-by-six stud". As shown, spanning member 12 is adapted to rest over a generally flat top or wall plate member or assembly 14 of an interior wall of a dwelling or commercial building structure. It should be appreciated by those of ordinary skill in the art that a dwelling may and usually does contain several assemblies 14 disposed throughout the dwelling and providing support for the various interior wall surfaces of the dwelling. While the ensuing discussion centers around a single truss 10 and a single assembly 14, it should be noted that the discussion is equally applicable to all of the trusses 12 and assemblies 14 used within the dwelling or building.

The plate member of assembly 14 typically is comprised of one wooden member which is typically referred to in the lumber industry as a "two-by-four stud", or two such members. If two such stud members 110, 112 are used to form top member assembly 14, as shown in FIG. 1, they are stacked in a manner in which they are longitudinally coextensive and in a manner in which their respective flat side portions 114, 116 cooperatively form a plane as do their respective end portions 118, 120. Spanning member 12 is placed upon the top member 14 in a manner, as shown, in which the long side 17 (e.g. the side having a width of about 3⅜") faces upwardly to abuttingly contact the lower side 19 (e.g. the side having a width of about 1⅝") of the spanning member 12.

When the truss 10 is initially constructed and secured to the plate member 14, the spanning member 12 (e.g. particularly the longitudinal axis 21 of the spanning member 12) is typically relatively straight with little or no bowing. However, as the temperature and humidity vary widely, such as that which occurs between the summer and winter months, and also when the individual component members of the truss 10, being made of wood, "dry out", the spanning member 12 typically flexes to assume the shape illustrated by dashed lines 18. Such bowing or flexing may also occur at substantially any angle outward from longitudinally axis 21 and not necessarily in the manner shown in FIG. 1. When this occurs, the spanning member 12, which is typically secured to the plate member 14 by nails driven in at an angle into the long sides 122 (e.g. the 3⅜" length sides) of the spanning member 12 and into plate member 14 are often unable to hold the spanning member 12 abuttingly against and upon the plate member 14. The flexing or bowing of the spanning member 12 can be significant, and often causes points upon member 12, such as point 23, to move a distance 215 ranging between ½" to ¾", from longitudinal axis 21, along the length thereof.

Figure 2:
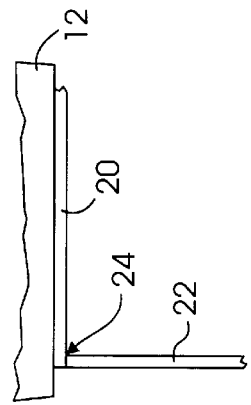
FIG. 2 is a partial cut-away side view illustrating the joint normally formed at the intersection of the wall board forming the ceiling and the wall board forming one wall in the absence of any bowing or flexing of the truss member.

Referring now to FIG. 2, there is shown a ceiling section 20 of dry wall or wall board adjoining a wall portion 22 of wall board or dry wall at a joint 24, also shown in FIG. 1. The ceiling section 20 is typically secured to a portion of the spanning member 12 of the truss 10. When no bowing or flexing of the spanning member 12 is occurring, there is a "clean" or seemingly "perfect" joint, as indicated at joint 24, where the ceiling section 20 and wall portion 22 meet.

Figure 3:
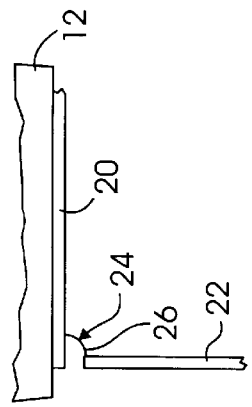
FIG. 3 is a view similar to that of FIG. 2 but illustrating the damage done by a flexing or bowing of the spanning member.

Referring briefly to FIG. 3, as the spanning member 12 assumes the bowed or flexed orientation shown for example and without limitation, by dashed lines 18 in FIG. 1, the ceiling section 20 may be lifted upwardly away from the wall portion 22. This causes the tape 26 at the joint 24 to be pulled away from the joint 24. When the spanning member 12 again assumes an unbowed or unflexed orientation, the ceiling section 20 will drop back down again, as shown in FIG. 2, but the joint tape 26 will no longer form a clean line at the joint 24. This damage to the joint 24 results in an unsightly appearance and can often require significant expense to repair, fix, and often can run several hundred dollars or more properly retape and repatch to obtain a clean joint. Moreover, the same damage can occur again, even after repair, if and when the spanning member 12 continues to flex or retracts some amount or distance.

To remedy the above problem and to achieve the various previously delineated objectives, Applicant has created a truss bracket 28 which is shown in FIGS. 4 through 7 and made in accordance with a preferred embodiment of the present invention. The truss bracket 28 generally includes a substantially planar base portion 30 having a generally rounded inner edge portion 32, an inside upright portion 34 extending substantially perpendicularly from the inner edge portion 32 a distance of preferably about 3.5", as indicated by dimensional line 36, and at an angle 222 of preferably about 90° with respect to the base portion 30. The inside upright portion 34 includes an upper and generally rounded edge portion 38 from which a top portion 40 extends perpendicularly (e.g. at an angle 228 of preferably about 90° with respect to portion 34). The top portion 40 includes an outer edge portion 42 from which an outer lip portion 44 protrudes downwardly at an angle substantially perpendicular (e.g. at an angle 224 of preferably about 90° with respect to portion 40) therefrom and parallel to the inside upright portion 34. The top portion 40 has a length of preferably about 1⅝" (e.g. about the width of a "two-by-four stud"), as indicated by dimensional arrow 46, which represents the distance between the inside surface 34a and 44a of the inside upright portion 34 and outer lip portion 44, respectively.

The distance represented by dimensional arrow 36 (i.e. about 3⅜") represents the distance from an inside surface 40a of the top portion 40 and the lower surface 30a of the base portion 30. It should be recognized that this length could vary significantly in accordance with the needs of particular applications. Although the length of the outer lip portion 44 may vary considerably, this distance, as represented by dimensional arrow 48, is preferably about 1.5 to about 2 inches. The length of the base portion 30 as represented dimensional arrow 31, is preferably at least about ¼", and more preferably about 1.5". The overall width of the bracket 28, as represented by dimensional line 49 in FIG. 5, is preferably about 3.0", although it will be appreciated that this width could also vary significantly in accordance with the needs of particular applications.

The base portion 30, inside upright portion 34, top portion 40 and outer lip portion 44 are preferably integrally formed from a single piece of material such as aluminum or metal and cooperatively provide a wooden and/or spanning member reception channel 226. In the preferred embodiment of the invention, the bracket 28 is comprised of selectable gauge of material, such as and without limitation, 12 gauge galvanized steel. It will be appreciated, however, that widely various types of material may be used to construct bracket 28, and that the thickness of the various portions of bracket 28 may also vary in accordance with the needs of particular applications.

Figure 5:
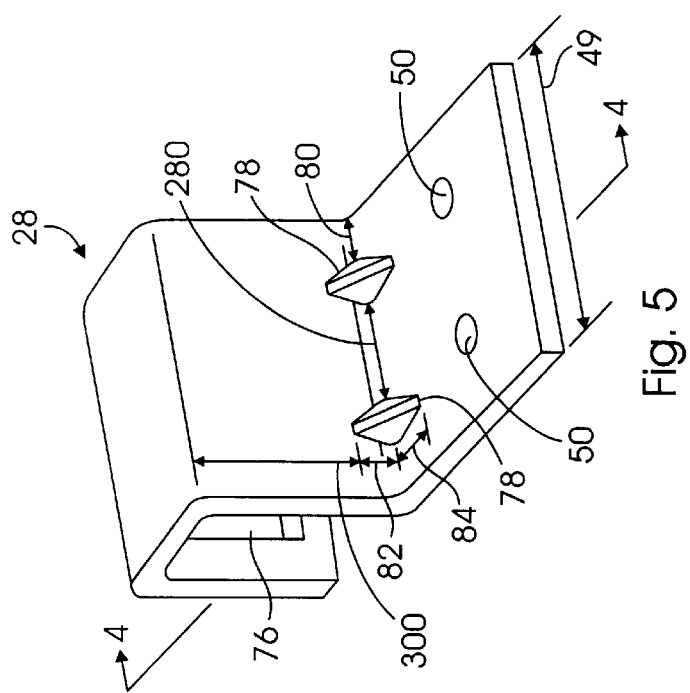
FIG. 5 is a front perspective view of the truss bracket made in accordance with a preferred embodiment of the present invention.
Figure 4:
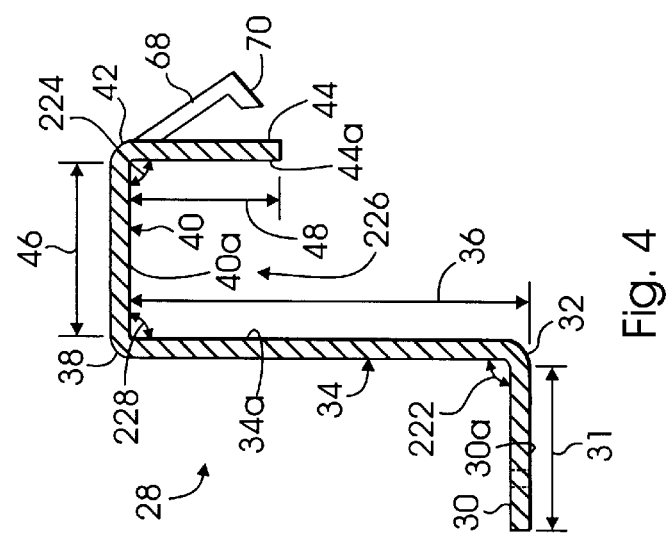
FIG. 4 is a side view of a truss bracket made in accordance with a preferred embodiment of the present invention.

With reference to FIG. 5, the base portion 30 further includes a plurality of generally round apertures 50 for enabling the base portion 30 to be secured to the plate member 14 of the interior wall 16. Suitable securing members such as nails or lag bolts may be extended through apertures 50 to fixedly secure the base portion 30 to the plate member 14.

With reference to FIGS. 4, 6, 7, and 8 lip portion 44 as shown, also includes one or more substantially "L"-shaped spike portions 68 which are movably joined to lip portion 44, which form an angle 250 of about 30° with respect to portion 34 when in a first unsecured position, and which are adapted to enable spanning member 12 to be secured within reception channel 226. In the preferred embodiment of the invention, substantially "L"-shaped spike portions 68 are formed, "punched," or otherwise machined out of the same single piece of material which integrally forms lip portion 44 and clamp 28 in a conventional and commercially acceptable manner. Each of the substantially "L"-shaped spike portions 68 includes an engaging portion 70 having a relatively sharp tip 230 which is adapted to partially penetrate member 12 and which further secures lip portion 44 and clamp 22 to spanning member 12 and prevents spanning member 12 from moving either vertically or horizontally in respect to bracket 28 and/or plate member 14 once spanning member 12 is received into channel 226. In the preferred embodiment of the present invention the "length" of the engaging portion 70 as represented by dimensional arrow 72, is preferably about ½". The "height" of substantially "L"-shaped spike portions 68 as represented by dimensional arrow 74 is preferably about ¾" to 1". Spike portions 68 allow bracket 28 to be secured to spanning member 12 without the use of nails, screws or other such implements. Bracket 28 may be quickly and easily secured to spanning member 12 by tapping or pounding spikes portions 68 inwardly with a hammer or other like device. As shown in FIG. 7, when spike portion 68 is tapped or pounded in, engaging portion 70 moves from its original or "unengaged" position outside of opening 76 to its secured or "engaged" position through opening 76, thereby penetrating spanning member 12. Unlike the prior use of nails and other like implements, substantially "L"-shaped spike portions 68 allow spanning member 12 to be conveniently secured to bracket 28 and plate member 14 even in locations where space and/or vertical clearance is limited, since the "hammer motion" required to engage spike portions 68 is nearly "horizontal" or parallel to plate member 14. Substantially "L"-shaped spike portions 68 also allow bracket 28 to be secured to spanning member 12 more safely and easily than nails alone since, an installer does not need to hold a nail or like implement in place while simultaneously manipulating a hammer in order to engage spike portions 68. While in the afore-described preferred embodiment of the present invention lip portion 44 comprises substantially "L"-shaped spike portions 68, it should be appreciated that the present invention is not limited to this exact construction, and that substantially similar "L"-shaped spike portions could be placed in other areas of bracket 28 in order to suit a particular application. For example and without limitation, in applications where horizontal "clearance" or space is limited, and vertical clearance is not, bracket 28 may be modified by forming, "punching" or otherwise machining substantially "L"-shaped spike portions which are substantially similar in structure and function to spike portions 68 into top portion 40 of bracket 28 rather than into lip portion 44. Also, it may be desirable in certain applications to form, "punch" or otherwise machine substantially "L"-shaped spike portions which are substantially similar in function and structure to spike portions 68 into base portion 30 of bracket 28 in place of apertures 50. This would enable bracket 28 to be fully and completely installed quickly and easily without requiring the use of any lag bolts, nails or other like implements.

Referring now to FIG. 5, the truss bracket 28 may also, in another embodiment, include one or more dimple portions 78. In the preferred embodiment of the present invention, two substantially similar dimple portions 78 are located along the junction of base portion 30 and inside upright portion 34 as illustrated in FIG. 5. Preferably, dimple portions 78 are formed, "punched" or otherwise machined into the material comprising the junction where base portion 30 and upright portion 34 meet. In the preferred embodiment of the invention, the distance between the center of each dimple portion 78 and the edge of base 30, as represented by dimension arrow 80 is approximately ½". Moreover, as best shown in FIG. 9, each dimple portion 78, in the preferred embodiment of the invention, is a solid tetrahedron with substantially identical triangular faces 260, each face 260 having substantially similar sides 252, 254, 256 equal to about ¼" to about ½". The addition of tetrahedron dimple portions 78 further improve the structural integrity of bracket 28, thereby preventing any bending or other deformation of bracket 28 in response to the twisting of spanning member 12 relative to plate member 14 and are preferably separated by a distance 28 (the distance corresponding to the distance between respective midpoints of the two closest respective sides 256 of adjacent dimple 78) of about two inches.

Referring now to FIGS. 7 and 8, the truss bracket 28 is adapted to receive spanning member 12 within channel 226 and to be secured to portions of the spanning member 12 and to the plate 14. From FIG. 8 it can be seen that the base portion 30 fits abuttingly, flushly against the plate member 14, while the inside upright portion 34, the top portion 40 and outer lip portion 44 fit securely over a portion of the spanning member 12. When the base portion 30 is secured to the plate member 14 and spike portions 68 are engaged, the truss bracket 28 fixedly secures the spanning member 12 to the plate member 14 to significantly help prevent, or completely eliminate, the bowing or flexing of the spanning member 12 in response to widely varying ambient temperature and humidity changes and the drying out of the wood members of the truss 10. Also illustrated in FIG. 8 are joint 24 and sections of wall portion 22 and ceiling portion 20. Bracket 28 will insure that joint 24, where ceiling section 20 and wall section 22 meet remains "clean" and/or seemingly perfect.

To install the bracket 28, the inside upright portion 34, top portion 40 and outer lip portion 44 are slid over a portion of the spanning member 28 until the base portion 30 flushly abuts the surface of plate member 14. Lag bolts, and preferably ³⁄₁₆" lag bolts, are then driven into the plate member 14 through apertures 50 to secure the base portion 30 fixedly to the plate member 14. The bracket 28 thus may be installed quickly and easily by skilled workman such as carpenters during the construction of dwellings and commercial buildings without the need for any special or expensive tools. It will also be appreciated that if the truss 10 includes a spanning member which is comprised of a "two-by-six stud", then the dimension represented by dimensional arrow 36 will be about 5.5" rather than ⅜" to accommodate the increased height. Accordingly, by simply varying the height represented by dimensional arrow 36, the bracket 28 can be easily adapted for use with either "two-by-four studs" or "two-by-six studs", as may be used in the construction of the truss 10.

The truss bracket 28 may thus be constructed from relatively inexpensive materials to form a means by which flexing or bowing of spanning members of trusses may be significantly reduced, or even eliminated entirely. The truss bracket of the preferred embodiments of the present invention is further relatively light in weight, easy to handle and easy to install during the construction process and, once installed, requires no adjustment using the previously described nails/implements. Moreover, bracket 28 may also be installed upon trusses 10 which have previously been installed for some time and, in this manner, may cooperate with the nails and/or other implements to provide further and additional protection against unwanted bowing or flexing. In this "retrofit" installation, the previously installed nails and other implements do not need to be removed. Also, the trusses 10 are normally installed in a manner allowing access through an attic thereby allowing bracket 28 to be retrofittedly (e.g. the action of retrofitting existing construction) installed without necessity for removal of any drywall.

Those skilled in the art can now appreciate from the foregoing description that the broad teachings of the present invention can be implemented in a variety of forms and dimensions. Therefore, while this invention has been described in connection with particular examples thereof, the true scope of the invention should not be so limited since other modifications will become apparent to the skilled practitioner upon a study of the drawings, specification and following claims.

What is claimed is:

1. A bracket for securing a stud acting as a spanning member of a truss to a wall plate member of an inner a wall of a dwelling, said truss bracket comprising:

a base portion adapted to be fixedly secured to said wall plate member of said inner wall;

an inside upright portion joined to said base portion at a junction and extending perpendicularly from said base portion;

a top portion extending perpendicularly from said upper end of said inside upright portion;

an outer lip portion extending perpendicularly from an outer edge of said top portion;

said base portion, said inside upright portion, said top portion, and said outer lip portion being joined together and adapted to clampingly fit over a portion of said stud acting as said spanning member;

a clamping means moveable between a first unsecured position, and a second secured position wherein said clamping means is adapted to penetrate said stud thereby securing said stud fixedly to said wall plate member to thereby prevent flexing and bowing of said stud; and at least one dimple portion located along said junction of said base portion and said inside upright portion and adapted to further increase the structural integrity of said bracket and to prevent twisting of said spanning member relative to said plate member.

2. The bracket of claim 1, wherein said base portion comprises at least one aperture for enabling a securing member to pass therethrough thereby fixedly securing said base portion to said wall plate member.

3. The bracket of claim 2, wherein said clamping means comprises at least one "L"-shaped spike portion adapted to be engaged to penetrate said spanning member thereby further securing said bracket to said spanning member.

4. The bracket of claim 1, wherein said base portion comprises at least one "L"-shaped spike portion adapted to be engaged to penetrate said plate member thereby securing said bracket to said plate member.

5. The bracket of claim 2, wherein said top portion comprises at least one "L"-shaped spike portion adapted to be engaged to penetrate said spanning member thereby further securing said bracket to said spanning member.

6. The bracket of claim 4, wherein said outer lip portion comprises at least one "L"-shaped spike portion adapted to be engaged to penetrate said spanning member thereby further securing said bracket to said spanning member.

7. A truss bracket for securing a stud acting as a spanning member of a truss to a wall plate member of an inner wall of a dwelling, to thereby prevent flexing and bowing of said spanning member, said truss bracket comprising:

a base portion having an inner edge;

an inside upright portion extending perpendicularly from said inner edge of said base portion, said inside upright portion including an upper end portion;

a top portion extending perpendicularly from said upper end of said inside upright portion and integrally formed with said upper end of said inside upright portion, said top portion further including an outer edge portion;

an outer lip portion extending perpendicularly of said outer edge portion of said top portion and parallel to said inside upright portion, said outer lip portion further being integrally formed with said outer edge portion of said top portion, and further having at least one moveable "L"-shaped spike portion adapted to be engaged to penetrate said spanning member thereby preventing said spanning member from moving either vertically or horizontally in respect to said plate member;

said base portion being adapted to be fixedly secured to said wall plate member of said inner wall;

said inside upright portion, said top portion and said outer lip portion operating cooperatively to partially circumscribe a portion of said spanning member secure said spanning member fixedly to said wall plate member, to thereby to help prevent flexing and bowing of said spanning member.

8. The truss bracket of claim 7, wherein said base portion includes at least one aperture for enabling a securing member to pass therethrough and secure said base portion fixedly to said plate member.

9. The truss bracket of claim 7, wherein said base portion comprises at least one "L"-shaped spike portion adapted to be engaged to penetrate said plate member thereby securing said bracket to said plate member.

10. The truss bracket of claim 7, further comprising a least one dimple portion located along said inner edge of said base portion and adapted to further increase the structural integrity of said bracket and to prevent twisting of said spanning member relative to said plate member.

* * * * *